United States Patent Office 3,546,161
Patented Dec. 8, 1970

---

3,546,161
POLYOLEFINS WITH IMPROVED LIGHT STABILITY
Joseph B. Wolheim, Brooklyn, N.Y., assignor to Allied Chemical Corporation, New York, N.Y., a corporation of New York
No Drawing. Filed Jan. 22, 1968, Ser. No. 699,310
Int. Cl. C08f 45/58
U.S. Cl. 260—45.85
5 Claims

ABSTRACT OF THE DISCLOSURE

A polyolefin resin such as polyethylene or polypropylene containing as stablizers small amounts of both a benzophenone, a phenyl salicylate, or a resorcinol monobenzoate compound and an alkyl amine. The stabilized resins are light stable and color stable for prolonged periods.

BACKGROUND OF THE INVENTION

This invention relates to synthetic resin including preservatives of (1) nitrogen-containing compounds and (2) benzophenone, phenyl salicylate, or resorcinol monobenzoate compounds. In particular, it relates to improved polyolefin compositions containing both (1) benzophenones, phenyl salicylates, phenyl salicylamides, or resorcinol monobenzoates and (2) alkyl amines. The compositions exhibit color stability and are resistant to the degradation effects of light and of heat and to adverse changes in strength associated with these effects.

It is known that exposure of polyolefins to light for any prolonged period of time causes discoloration, loss of strength, and brittleness. Therefore, it has been found desirable to incorporate small amounts of stabilizers in the polyolefin to retard such discoloration and instability. Heretofore, a great number of compounds designed to function as stabilizers for this purpose have been developed. The stabilizers employed conventionally are usually costly ultra-violet absorbers whose function is to absorb radiant energy of wavelength just below visible light and to dissipate the absorbed energy in some harmless form other than visible light. Any double bonds, triple bonds, and to a less degree unbonded electron pairs in the ultraviolet absorber contribute to the absorbing capacity of these stabilizers in decreasing the light sensitivity of unsaturated substances. However, polyolefins stabilized by these conventional ultraviolet absorbers are usually only effective for periods of exposure ranging from about two to, at the most, about three times longer than those of the polyolefin alone. This somewhat limits the possible degree of application of polyolefins stabilized by these conventional ultraviolet absorbers.

SUMMARY OF THE INVENTION

It has now been found in accordance with this invention, that stabilized polyolefin compositions can be obtained by incorporating in the composition as a stabilizing system both (1) a carbonyl compound selected from the group consisting of benzophenones, phenyl salicylates, phenyl salicylamides, resorcinol monobenzoates, and mixtures thereof, and (2) at least one alkyl amine. These compositions are color stable and are resistant to the degradation action of light, heat, and oxygen for prolonged periods. Furthermore, they are economical and easy to prepare. More specifically, the synergistic stabilizing system of this invention consists of:

(A) At least one constituent selected from the group consisting of carbonyl compounds having the following formulas:

(I)
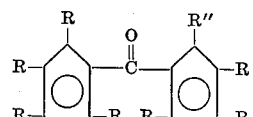

(II)
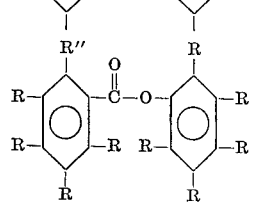

and (III)
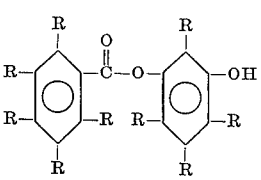

wherein R is selected from the group consisting of a hydrogen atom, an alkyl radical, an alkoxy radical, a hydroxy radical, and mixtures thereof; and R″ is selected from the group consisting of a hydroxyl radical and an amino radical; and (B) at least one constituent selected from the group consisting of alkyl amine compounds having the following formula:

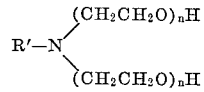

wherein R′ is an alkyl radical or an acyl radical and $n$ is an integer from 0 to 10.

The present invention may also include small amounts of antioxidants.

DETAILED DESCRIPTION

One of the essential features of this invention is the requirement that the two aforementioned compounds must be used together. It has been found that neither of these compounds alone is entirely satisfactory as stabilizing agent for polyolefins; but by combining these aforementioned compounds, a synergistic effect is obtained which makes their mixture extremely effective as stabilizers. The combination results in more effective stabilization of the polyolefins than would be expected by just the additive effect of the combination. While an exact explanation behind the stabilizing action of the stabilizers of this invention is not known, the product has proven to be of high quality as will be shown hereafter.

The first compound of the stabilizing combination of this invention is selected from the group consisting of carbonyl compounds containing preferably from about 13 carbon atoms to 35 carbon atoms and preferably from about 2 oxygen atoms to 5 oxygen atoms, and more preferably 2 oxygen atoms, and having the following formulas:

(I) 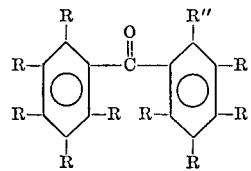

(II) 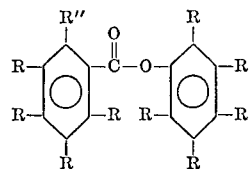

and (III) 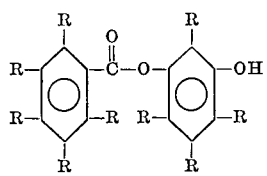

wherein R is selected from the group consisting of a hydrogen atom, an alkyl radical, a hydroxy radical, an alkoxy radical, and mixtures thereof; and R'' is selected from the group consisting of a hydroxyl radical, a primary amino radical, and a secondary amino radical. In the aforementioned formula, R may be the same radical throughout or different radicals and is preferably a straight chain radical. R'' is preferably a hydroxyl radical. These carbonyl compounds act as ultraviolet absorbers which aid in diminishing the detrimental effect of light on the unsaturated polyolefins.

The alkyl radical portions and alkoxy radical portions of the molecules of compounds I, II, and III are not critical and thus may be present without adversely affecting the principal objective; namely, the inclusion of hydroxyl or amino radical in preferably an ortho-position to the carbonyl (C=O) group in order to form a hydrogen bond thereto. It is assumed that the resorcinol monobenzoates of this invention (III) undergo a rearrangement upon exposure to ultraviolet light wherein the C—O bond breaks and the carbon atom of the carbonyl group bonds to a position para to the existing hydroxyl radical while a new hydroxyl radical forms at the point of the bond breakage and is thus in an ortho position to the carbonyl group.

Specific groups of suitable carbonyl compounds of this invention includes 2-hydroxy-4-N-octyloxybenzophenone, 4-dodecyloxy-2-hydroxy benzophenone, p-N-octylphenyl salicylate, p-N-octyloxy phenyl salicylate, 2,2'-dihydroxy-4-N-octyloxybenzophenone, 4-decyloxy-2-hydroxybenzophenone, 2,2'-dihydroxy-4-methoxybenzophenone, 2,4-dihydroxy-benzophenone, 2,2'-dihydroxy-4,4' - dioctyloxybenzophenone, 4-dodecyl-2-hydroxybenzophenone, 2-hydroxy-2'-N-octylbenzophenone, resorcinol monobenzoate, 2-amino-octyloxybenzophenone, and mixtures thereof. The preferred types of these compounds suitable for this invention are 2-hydroxy benzophenone (I) and phenyl salicylates (II). The most preferred carbonyl compounds are 2-hydroxy-4-N-octyloxybenzophenone, 4-dodecyloxy-2-hyroxybenzophenone, and p-octylphenyl salicylate. Carbonyl compounds are presently employed in a total concentration preferably ranging from about 0.1% to about 1.0%, more preferably of about 0.3% by weight of said polyolefin.

The second compound of the stabilizing combination of this invention is selected from the group consisting of alkyl amines having the following formula:

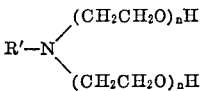

wherein R' is selected from the group consisting of an alkyl radical of from about 4 carbon atoms to 22 carbon atoms, preferably from about 10 carbon atoms to 20 carbon atoms, and an acyl radical of from about 4 carbon atoms to 22 carbon atoms, preferably from about 10 carbon atoms to 20 carbon atoms; and $n$ is an integer from 0 to 10, preferably from 1 to 2. The alkyl amines employed herein, besides aiding effectively the light stability of polyolefins, usually serve as favorable antistatic agents. In this capacity as antistatic agents in polyolefin compositions, these amines reduce static electric charges on the compositions, and thus provide the light stable polyolefin with additional beneficial properties such as retardation of dust accumulation.

Another advantage of using the alkyl amine compounds is that they inhibit the yellowing of the resins caused by the presence of certain antioxidants therein, especially the phenolic antioxidants; such yellowing is apparent even under normal storage conditions in areas not exposed to ultraviolet light. The alkyl amine compounds are solely responsible for retarding the yellowing in resins containing the phenolic antioxidants.

A specific type of alkyl amine suitable for this invention includes alkyl diethanol amines. Specific examples of suitable amines to which the invention is applied include tallow diethanol amine, coco-diethanol amine, stearyl diethanol amine, tallow bis-(hexaethylene glycol) amine, N,N-diethanol stearamide, and mixtures thereof. The amine compounds are presently employed in a concentration preferably ranging from about 0.05% to 0.06%, more preferably of about 0.13% by weight of said polyolefin. Larger amounts of the said stabilizers of this invention may be used with polyolefins but without a corresponding increase in the stability of the composition. Lower amounts give products that lack the desired stability.

Each of the aforementioned stabilizers may be prepared in good yield and of sufficient purity for this invention by processes well known to those skilled in the art.

The polyolefins employed in this invention preferably include polyethylene, polypropylene, copolymers derived from a major portion by weight of at least one of the said polyolefins, and mixtures thereof. Suitable copolymers for this invention include polyethylene-butene copolymers and polypropylene-ethylene copolymers. Polybutene may also be used as the polyolefin of this invention.

The polyolefin compositions may also include commerically available antioxidants that even further improve heat stability and retard deterioration and rancidity of the polyolefin. Specific examples of suitable antioxidants include 4,4' - thiobis (6-tert-butyl-meta-cresol), 2,6-di-tert-butyl-para-cresol, and mixtures thereof. The concentration of antioxidants, when used, preferably ranges from about 0.01% to about 2.0%, more preferably from about 0.02% to about 1.0%, by weight of said polyolefin.

The stabilizers, as well as any antioxidant preferably added, may be incorporated in the polyolefin by any of the known mixing processes, provided a uniform distribution of the components is obtained. The order of addition of the components in these known processes is not critical. The known processes normally involve mixing the components of the composition while heating the said components to a temperature above the melting point of the polyolefin.

Several examples are set forth below to illustrate the nature of the invention and the manner of its execution. However, the invention should not be considered as being limited to the details thereof. All parts are by weight unless otherwise indicated.

EXAMPLE 1

100 parts polyethylene of specific gravity of about 0.95 and of melt index of about 0.4, 0.30 part 2-hydroxy-4-N-octyloxybenzophenone, 0.13 part tallow diethanol amine, 0.05 part 4,4'-thiobis (6-tert-butyl-meta-cresol), and 0.03 part 2,6-di-tert-butyl-para-cresol were mixed in a 25 pound Banbury mixer while heated to a temperature of about 400° F. until a uniform distribution of the components was obtained.

In order to illustrate the effect of the invention, several compositions were compared by measuring tensile strength percent absolute elongation, and color stability. Samples from the above and similar compositions were subjected to weathering tests involving high energy effect of sunlight and of oxidation, and of the accumulated effect of low humidity, wind, and rain. The compositions were exposed with backing at 45° south direct to the sun in Arizona for over 22 months and then tested on a Baldwin testing machine at 5.0 inches per minute crosshead speed in order to determine tensile strength in psi and percentage absolute elongation. A sample was considered brittle and thus ineffectual when an absolute elongation of 10% or less was obtained.

Color stability was determined by storing the samples, which were white at the beginning of testing, in the absence of ultraviolet light until a noticeable yellowing of the samples was observed.

The results of the above measurements are recorded in Table I which follows:

TABLE I

| Ingredients of samples tested | Testing time, months | | | | | | | | | | | | | |
|---|---|---|---|---|---|---|---|---|---|---|---|---|---|---|
| | 0 | 1 | 2 | 3 | 4 | 6 | 8 | 10 | 12 | 14 | 16 | 18 | 20 | 22 |
| Example 1:[1] | | | | | | | | | | | | | | |
| Tensile strength, p.s.i. | 3,280 | | | 3,308 | | 3,560 | 3,490 | 3,040 | 3,610 | 3,640 | 3,620 | 3,500 | 3,670 | 3,520 |
| Percent absolute elongation | 395 | | | 500 | | 250 | 160 | 200 | 150 | 120 | 130 | 40 | 20 | 40 |
| Color | ([6]) | | | | | | | | | | | | | ([7]) |
| Comparative Example A:[2] | | | | | | | | | | | | | | |
| Tensile strength, p.s.i. | 3,790 | 3,620 | 3,750 | 3,620 | 1,600 | | | | | | | | | |
| Percent absolute elongation | 120 | 240 | 310 | 50 | 0 | | | | | | | | | |
| Color | ([6]) | | | ([8]) | | | | | | | | | | |
| Comparative Example B:[3] | | | | | | | | | | | | | | |
| Tensile strength, p.s.i. | 3,620 | 3,590 | 3,740 | 3,580 | 1,690 | | | | | | | | | |
| Percent absolute elongation | 275 | 380 | 390 | 55 | 0 | | | | | | | | | |
| Color | ([6]) | | | ([9]) | | | | | | | | | | |
| Comparative Example C:[4] | | | | | | | | | | | | | | |
| Tensile strength, p.s.i. | 3,550 | | | 3,450 | | 3,750 | 1,770 | | | | | | | |
| Percent absolute elongation | 245 | | | 360 | | 60 | 0 | | | | | | | |
| Color | ([6]) | | | ([10]) | | | | | | | | | | |
| Comparative Example D:[5] | | | | | | | | | | | | | | |
| Tensile strength, p.s.i. | 3,520 | 3,560 | 3,650 | 3,520 | 1,970 | | | | | | | | | |
| Percent absolute elongation | 360 | 330 | 310 | 35 | 0 | | | | | | | | | |
| Color | ([6]) | | | | | | | | | | | | | ([7]) |

[1] Contains both carbonyl compound and alkyl amine as stabilizers.
[2] Contains neither stabilizer of this invention.
[3] Contains neither stabilizer of this invention.
[4] Contains only carbonyl compound.
[5] Contains only alkyl amine.
[6] White.
[7] Still white.
[8] Yellow.
[9] More yellow.
[10] Even more yellow.

EXAMPLE 2

The same procedure as in Example 1 was followed, using 100 parts polyethylene of density of about 0.95 and of melt index of about 1.0, 0.30 part 2-hydroxy-4-N-octyloxy-benzophenone, 0.13 part tallow diethanol amine, 0.05 part 4,4'-thiobis (6-tert-butyl-meta-cresol), and 0.03 part 2,6-di-tert-butyl-para-cresol.

Several samples from the above and similar compositions were compared by measuring tensile strength and percent absolute elongation. The results of these measurements are recorded in Table II which follows:

TABLE II

| Ingredients of samples tested | Testing time, months | | | | | | | | | | | | | |
|---|---|---|---|---|---|---|---|---|---|---|---|---|---|---|
| | 0 | 1 | 2 | 3 | 4 | 6 | 8 | 10 | 12 | 14 | 16 | 18 | 20 | 22 |
| Example 2:[1] | | | | | | | | | | | | | | |
| Tensile strength, p.s.i. | 2,910 | | | 3,150 | | 3,310 | 3,260 | | 3,170 | 3,260 | 3,310 | 3,080 | 3,260 | 3,000 |
| Percent absolute elongation | 270 | | | 255 | | 170 | 110 | | 180 | 100 | 80 | 35 | 30 | 30 |
| Comparative Example E:[2] | | | | | | | | | | | | | | |
| Tensile strength, p.s.i. | 3,180 | 3,410 | 3,340 | 3,320 | 1,290 | | | | | | | | | |
| Percent absolute elongation | 125 | 135 | 490 | 25 | 0 | | | | | | | | | |
| Comparative Example F:[3] | | | | | | | | | | | | | | |
| Tensile strength, p.s.i. | 3,480 | 3,250 | 3,190 | 3,100 | 1,150 | | | | | | | | | |
| Percent absolute elongation | 145 | 235 | 380 | 15 | 0 | | | | | | | | | |
| Comparative Example G:[4] | | | | | | | | | | | | | | |
| Tensile strength, p.s.i. | 3,020 | | | 3,130 | | 3,360 | 2,410 | | | | | | | |
| Percent absolute elongation | 125 | | | 285 | | 110 | 10 | | | | | | | |

[1] Contains both carbonyl compound and alkyl amine as stabilizers.
[2] Contains neither stabilizer of this invention.
[3] Contains neither stabilizer of this invention.
[4] Contains only carbonyl compound.

As seen in the aforementioned results of Example 1 and Example 2, the samples without the carbonyl compound became brittle after about 3 to 4 months exposure in sunlight, while the samples containing the carbonyl compound were effective for only about 8 months. However, the samples containing both the carbonyl compounds and the alkyl amines did not become brittle even after 22 months of light exposure. Furthermore, the compositions containing the alkyl amines did not yellow even after storing for 36 months, thus verifying the color stability exhibited in the invention.

EXAMPLE 3

Repeat Example 1 substituting polyethylene of specific gravity of about 0.96 and of melt index of about 0.4 for polyethylene of specific gravity of about 0.95 and of melt index of about 0.4.

EXAMPLE 4

Repeat Example 1 substituting polyethylene of specific gravity of about 0.93 and of melt index of about 0.8 for polyethylene of specific gravity of about 0.95 and of melt index of about 0.4.

EXAMPLE 5

Repeat Example 1 substituting polyethylene of specific gravity of about 0.91 and of melt index of about 0.3 for polyethylene of specific gravity of about 0.95 and melt index of about 0.4.

EXAMPLE 6

Repeat Example 1 substituting polypropylene of specific gravity of about 0.90 and melt flow of about 3.0 for polyethylene.

EXAMPLE 7

Repeat Example 1 substituting polypropylene-ethylene copolymer for polyethylene.

EXAMPLE 8

Repeat Example 1 substituting 4-dodecyloxy-2-hydroxy benzophenone for 2-hydroxy-4-N-octyloxybenzophenone.

EXAMPLE 9

Repeat Example 1 substituting p-octylphenyl salicylate for 2-hydroxy-4-N-octyloxybenzophenone.

EXAMPLE 10

Repeat Example 1 substituting p-octyloxyphenyl salicylate for 2-hydroxy-4-N-octyloxybenzophenone.

EXAMPLE 11

Repeat Example 1 substituting 0.80 parts 2-hydroxy-4-N-octyloxybenzophenone for 0.30 parts 2-hydroxy-4-N-octyloxybenzophenone.

EXAMPLE 12

Repeat Example 1 substituting 2,2'-dihydroxy-4-N-octyloxybenzophenone for 2-hydroxy-4 - N - octyloxybenzophenone.

EXAMPLE 13

Repeat Example 1 substituting 4-N-decyloxy-2-hydroxybenzophenone for 2-hydroxy-4-N-octyloxybenzophenone.

EXAMPLE 14

Repeat Example 1 substituting 2,2'-dihydroxy-4-methoxybenzophenone for 2-hydroxy-4-N-octyloxybenzophenone.

EXAMPLE 15

Repeat Example 1 substituting 2-hydroxy-2'-N-octylbenzophenone for 2-hydroxy-4-N-octyloxybenzophenone.

EXAMPLE 16

Repeat Example 1 substituting stearyl diethanol amine for tallow diethanol amine.

EXAMPLE 17

Repeat Example 1 substituting tallow bis-(hexaethylene glycol) amine (M=6), for tallow diethanol amine.

EXAMPLE 18

Repeat Example 1 substituting N,N-diethanol stearamide

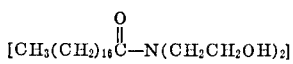

for tallow diethanol amine.

EXAMPLE 19

Repeat Example 1 substituting 0.50 part tallow diethanolol amine for 0.13 part tallow diethanol amine.

The improved polyolefin compositions of this invention exhibit improved clearness, tensile strength, and flexibility or resistance to brittleness after prolonged periods of exposure to light in comparison to commercially existing stabilized polyolefin compositions. The superior compositions of this invention can be used effectively and economically for such specific outdoor applications as stadium seats, chairs, mailboxes, etc.

Various modifications will be apparent to one skilled in the art and it is not intended that this invention be limited to the details in the specific examples presented by way of illustration. Accordingly, the scope of the invention is limited only by the appended claims.

What is being claimed is:
1. A light stabilized synthetic resin composition comprising:
 (A) a major portion by weight of a polyolefin derived from ethylene, propylene or butene monomers and mixtures thereof; and
 (B) an effective stabilizing minor portion by weight of a stabilizing system comprising:
  (I) at least one constituent selected from the group of carbonyl compounds containing from about 13 carbon atoms to 35 carbon atoms and from about 2 oxygen atoms to 5 oxygen atoms and having the following formulas:

(a) 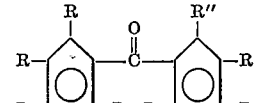

(b) 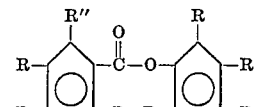

and (c) 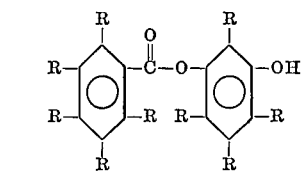

wherein R is selected from the group consisting of an alkyl radical, a hydrogen atom, an alkoxy radical, hydroxy radical, and mixtures thereof; and R" is selected from the group consisting of a hydroxy radical, a primary amino radical, and a secondary amino radical; and
  (II) at least one constituent selected from the group consisting of alkyl amines having the following formula:

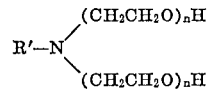

wherein R' is an alkyl radical of from about 4 carbon atoms to 22 carbon atoms and $n$ is an integer from 0 to 10; and
  (III) an antioxidant selected from the group consisting of 4,4'-thiobis (6-tert-butyl-meta-cresol), 2,6 - di - tert - butyl para-cresol, and mixtures thereof.

2. A composition as defined in claim 1 wherein said polyolefin is selected from the group consisting of polyethylene, polypropylene, copolymers derived from a major portion by weight of at least one of the said polyolefins, and mixtures thereof.

3. A composition as defined in claim 1 wherein said carbonyl compounds are selected from the group consisting of 2-hydroxy-4-N-octyloxybenzophenone, 4-dodecyloxy-2-hydroxybenzophenone, p-N - octylphenyl salicylate, and mixtures thereof, and said alkyl amine is tallow diethanol amine.

4. A light stabilized synthetic resin composition comprising:
 (A) a major portion by weight of a polyolefin derived from ethylene, propylene or butene monomers and mixtures thereof; and
 (B) a stabilizing system comprising
  (I) at least one constituent selected from the group of carbonyl compounds containing from about 13 carbon atoms to 35 carbon atoms and from about 2 oxygen atoms to 5 oxygen atoms having the following formulas:

(a) 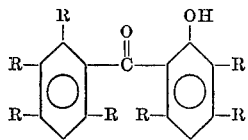

(b) 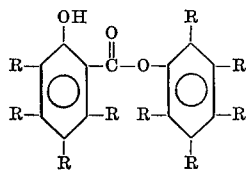

and (c) 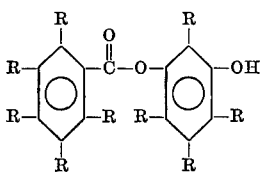

wherein R is selected from the group consisting of an alkyl radical, a hydrogen atom, an alkoxy radical, a hydroxy radical, and mixtures thereof; said compounds ranging in concentration of from about 0.1% to about 1.0% by weight of said polyolefin; and (II) at least one constituent selected from the group consisting of alkyl amines having the following formula:

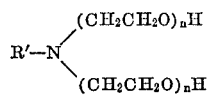

wherein R is an alkyl radical of from about 4 carbon atoms to 22 carbon atoms and $n$ is an integer from 0 to 10, said alkyl amines ranging in a concentration of from about 0.05% to about 0.60% by weight of said polyolefin; and (III) an antioxidant, said antioxidant being selected from the group consisting of 4,4'-thiobis (6-tert-butyl-meta - cresol), 2,6-di-tert-butyl-para-cresol and mixtures thereof in a concentration ranging from about .01% to about 2.0% by weight of said polyolefin.

5. A stabilizing synthetic resin composition comprising
(A) a major portion by weight of polyethylene; and
(B) a stabilizing system comprising
  (I) 2 - hydroxy-4-N-octyloxybenzophenone in a concentration of about 0.28% to about 0.32% by weight of said polyethylene;
  (II) tallow diethanol amine in a concentration of about 0.10% to about 0.15% by weight of said polyethylene.
  (III) and an antioxidant selected from the group consisting of 4,4'-thiobis (6-tert-butyl-meta-cresol), 2-6-di-tert-butyl-para-cresol and mixtures thereof.

References Cited
UNITED STATES PATENTS

| | | | |
|---|---|---|---|
| 2,938,879 | 5/1960 | Mock | 260—32.6 |
| 3,349,059 | 10/1967 | Lappin | 260—45.85 |
| 3,365,437 | 1/1968 | Marra | 260—94.9 |
| 3,371,039 | 2/1968 | Cyba | 260—45.9 |
| 3,383,354 | 5/1968 | Prinz | 260—45.85 |

DONALD E. CZAJA, Primary Examiner

V. P. HOKE, Assistant Examiner

U.S. Cl. XR
260—45.9, 45.95

PO-1050
(5/69)

UNITED STATES PATENT OFFICE
CERTIFICATE OF CORRECTION

Patent No. 3,546,161    Dated December 8, 1970

Inventor(s) Joseph B. Wolheim

It is certified that error appears in the above-identified patent and that said Letters Patent are hereby corrected as shown below:

Column 1, line 14, "stablizers" should read -- stabilizers --

Column 1, line 22, "resin" should read -- resins --.

Column 2, Formula (1) " 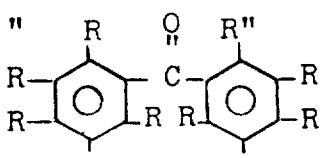 " should read

-- 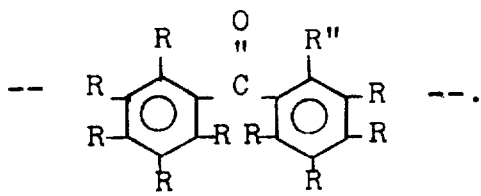 --.

Column 3, line 47, after "of", insert -- the --.

Column 3, line 58, "includes" should read -- include --.

Column 4, line 38, "0.06%" should read -- 0.60% --.

Column 5, Table I, in Comparative Example $B^3$, under heading "0", "3,620" should read -- 3,630 --.

Column 7, line 62, "anolol" should read -- anol --.

Column 10, line 1, "R" should read -- R' --.

Signed and sealed this 30th day of March 1971.

(SEAL)
Attest:

EDWARD M. FLETCHER, JR.      WILLIAM E. SCHUYLER, JR.
Attesting Officer            Commissioner of Patents